United States Patent [19]
Henry et al.

[11] Patent Number: 5,889,679
[45] Date of Patent: Mar. 30, 1999

[54] FUSE ARRAY CONTROL FOR SMART FUNCTION ENABLE

[75] Inventors: G. Glenn Henry; Arturo Martin-de-Nicolas; Daniel G. Miner, all of Austin, Tex.

[73] Assignee: Integrated Device Technology, Inc., Santa Clara, Calif.

[21] Appl. No.: 892,640

[22] Filed: Jul. 15, 1997

[51] Int. Cl.$^6$ .................................................. G06F 15/00
[52] U.S. Cl. ........................................ 364/488; 364/490
[58] Field of Search ............................. 395/800.01, 181, 395/182.01, 182.08; 364/488, 489, 490, 491

[56] References Cited

U.S. PATENT DOCUMENTS

| | | | |
|---|---|---|---|
| 4,687,951 | 8/1987 | McElroy | 307/269 |
| 4,855,613 | 8/1989 | Yamada et al. | 307/202.1 |
| 4,972,105 | 11/1990 | Burton et al. | 307/468 |
| 5,193,199 | 3/1993 | Dalrymple et al. | 395/775 |
| 5,270,976 | 12/1993 | Tran | 365/200 |
| 5,281,868 | 1/1994 | Morgan | 307/441 |
| 5,301,143 | 4/1994 | Ohri et al. | 365/96 |
| 5,303,181 | 4/1994 | Stockton | 365/96 |
| 5,430,679 | 7/1995 | Hiltebeitel et al. | 365/200 |
| 5,442,589 | 8/1995 | Kowalski | 365/225.7 |
| 5,444,000 | 8/1995 | Ohkubo et al. | 437/8 |
| 5,455,937 | 10/1995 | Berman et al. | 395/500 |
| 5,467,304 | 11/1995 | Uchida et al. | 365/174 |
| 5,471,431 | 11/1995 | McClure | 365/225.7 |
| 5,495,446 | 2/1996 | Teel et al. | 365/200 |
| 5,521,116 | 5/1996 | Boku | 437/60 |
| 5,528,539 | 6/1996 | Ong et al. | 365/200 |
| 5,548,555 | 8/1996 | Lee et al. | 365/200 |
| 5,552,743 | 9/1996 | Manning | 327/567 |
| 5,566,107 | 10/1996 | Gilliam | 365/200 |
| 5,596,535 | 1/1997 | Mushya et al. | 365/200 |
| 5,596,538 | 1/1997 | Joo | 365/201 |
| 5,734,274 | 3/1998 | Gavish | 327/48 |

*Primary Examiner*—Dennis M. Butler
*Attorney, Agent, or Firm*—James W. Huffman

[57] ABSTRACT

An apparatus and method for smart configuration of functional blocks within a semiconductor device is provided. A fuse array contains a plurality of fuses that are blown in manufacturing to enable/disable functional blocks on the semiconductor device. A control unit reads the state of the fuses, and logically merges the fuse states with a default configuration for the functional blocks. The result of the merge operation is stored in a feature control register that individually enables/disables the functional blocks. The control unit also receives a write command from an external source that modifies the feature control register, after the device is shipped from the manufacturer. The control unit selectively blocks writes to the feature control register that attempt to enable/disable functional blocks that should not modified.

47 Claims, 4 Drawing Sheets

FUSE ARRAY CONTROL FOR SMART FUNCTION ENABLE

BACKGROUND OF THE INVENTION

1. Field of the Invention

This invention relates in general to the field of semiconductor device configuration, and more specifically to a method and apparatus that utilizes a smart fuse array on a semiconductor device to selectively enable/disable particular functional units on the device.

2. Description of the Related Art

A fuse is a circuit element with an initial structure that provides an electrical connection between two points, but which may be irreversibly destroyed thereby electrically disconnecting the two points. Fuses are sometimes used within integrated circuit devices to remove defective circuits from active operation, and to replace those defective circuits with good operable redundant circuits. Such fuses are typically fabricated in a conductive layer buried within a structure of a surrounding insulator material on the die of semiconductor device. A selected fuse is blown by directing a laser beam at the fuse, or by providing excessive electrical current to the fuse.

An example of a fuse 102 within a semiconductor circuit 100 is shown in FIG. 1. The fuse 102 is shown connected between a ground 104 and the source 106 of a FET 108. The FET 108 is configured to be "on". The source 106 is connected to a buffer 112 that is output to a particular functional block (not shown) to enable or disable the functional block. When the fuse 102 is intact, the source 106 is low, providing a logic low signal to the buffer 112. If the fuse 102 is blown, the source 106 goes high, creating a logic high signal to the buffer 112.

Thus, the circuit provides a permanent output from the buffer 112 that is either low or high, based on the condition of the fuse 102, intact or blown. The state of the fuse 102 is set at the time of manufacture, and is not modified at a later time.

To illustrate how the circuit 100 is used within a semiconductor device, reference is now made to FIG. 2. In FIG. 2, a memory device 200 is shown that includes a plurality of individually addressable memory cells 204. Also provided on the memory device 200 are a plurality of redundant memory cells 206. Each of the memory cells 206 are connected to fuse circuits 208. One skilled in the art should appreciate that not all of the memory cells 204 may be functional at the end of manufacturing. Therefore, after the device 200 has completed the manufacturing process, the memory cells 206 are tested to determine if any failures exist. Cells 210, 212 represent failed memory cells within the device 200. Fuses 208 attached to the redundant memory cells 206 on the rows associated with cells 210, 212 are blown to enable operation of those memory cells. Fuses are blown on rows where defective memory cells exist, thereby enabling associated redundant memory cells 206. Thus, by providing redundant memory cells 206, and fuse circuits 208 within the design of the device 200, defective memory cells may be selectively replaced before the device 200 is shipped to the customer. For a more complete background on the use of fuse circuits within a memory device, attention is directed to U.S. Pat. No. 5,548,555 to Lee et al., entitled METHOD AND CIRCUIT FOR REPAIRING DEFECT IN A SEMICONDUCTOR MEMORY DEVICE, the contents of which are hereby incorporated by reference.

One of the problems associated with utilizing fuse circuits to enable/disable particular functional blocks within a semiconductor device, whether a memory cell, or a complex circuit, is that once the state of the fuse is modified, i.e., by blowing the fuse, the effect on the semiconductor device is forever changed. Where fuses are used to replace defective memory cells with redundant memory cells, this is not a serious issue. However, when fuses are used to enable/disable more sophisticated functional blocks within a semiconductor device, the permanent "fused" condition is much more costly.

For example, if a fuse circuit were used to enable a floating point unit on a microprocessor, at the time of manufacture, a fuse would be blown (or left intact) to enable the FPU. All microprocessors manufactured at the same time would also have their FPU's enabled. If at some later point it was determined that the floating point unit was defective, there would be no way to disable the defective floating point unit. All of the microprocessors manufactured in that batch would have to be thrown away. This is very costly, not only for the original manufacturer, but also for all OEM's that maintained inventories of the microprocessor to build their products. One notorious example of a costly floating point unit problem required the manufacturer to provide a no questions asked replacement policy for all defective microprocessors.

Alternatively, if a particular functional block on a microprocessor is operational, but at the time of manufacture it is not desired to turn it "on", its associated fuse is blown, thereby permanently disabling the functional block. When a decision is made to turn the functional block on, currently manufactured microprocessors have their fuse left intact. However, for all of the microprocessors whose fuses are already blown, it is too late.

Moreover, as the number of functional blocks on semiconductor devices increase, so does the number of associated fuses. Requiring a one to one correspondence between functional blocks to be enabled/disabled and control fuses becomes costly, and takes up valuable die space.

What is needed is an apparatus that solves the above problems by providing an apparatus and method that allows functional blocks on semiconductor devices to be enabled/disable via a fuse array, but which also allows enablement of the functional blocks to be set to a predetermined default, or later modified through software.

SUMMARY

To address the above-detailed deficiencies, it is an object of the present invention to provide an apparatus that allows for smart enabling of functional units on semiconductor devices.

Accordingly, in the attainment of the aforementioned object, it is a feature of the present invention to provide a microprocessor that has a number of functional blocks that may be individually enabled/disabled. The microprocessor includes a fuse array control and a control unit. The fuse array control is coupled to the functional blocks and selectively signals the functional blocks to be enabled/disabled. The fuse array control includes a fuse array. The control unit is coupled to the fuse array control, reads the fuse array, and indicates to the fuse array control which of the plurality of functional blocks should be enabled/disabled.

An advantage of the present invention is that functional blocks within a microprocessor may be selectively enabled/disabled, either by blowing fuses within a fuse array, during manufacturing, or later via software control, regardless of the state of the blown fuses.

A further object of the present invention is to design a microprocessor that incorporates a number of different functional blocks, each of which may be selectively turned on/off, either at the time of manufacturing by blowing selected fuses, or after manufacturing by incorporating a particular default condition within a control ROM, or overwriting the default condition by executing a write instruction to a machine specific register.

It is therefore a feature of the present invention to provide a microprocessor that has a plurality of functional blocks that are individually enabled/disabled. The microprocessor includes a fuse array, a feature control register, and a control unit. The fuse array is fabricated on the die of the microprocessor and includes a plurality of fuses that are individually blown during manufacturing. The feature control register is coupled to the fuse array to selectively enable/disable particular ones of the plurality of functional blocks. The control unit is coupled to the feature control register to read the state (closed or open) of the plurality of fuses, and to store into the feature control register a value indicative of which of the plurality of functional blocks are to be enabled/disabled.

An advantage of the present invention is that a single mask may be used to manufacture a variety of different microprocessors, each incorporating only those functional blocks that are applicable to their market.

A further advantage of the present invention is that if particular functional blocks create a problem in a particular processing environment, they may be turned off by simply writing a particular code to a register within the microprocessor.

Another feature of the present invention is to provide a method for selectively enabling/disabling functional blocks on a microprocessor. The microprocessor has a plurality of fuses, particular ones of which are blown during manufacturing. The method includes reading the state of the plurality of fuses, determining from the step of reading which of the functional blocks are to be enabled/disabled, logically merging results from the step of determining with a predetermined configuration for the functional blocks; and enabling/disabling the functional blocks according to the result from the step of logically merging.

An advantage of the present invention is that if particular functional blocks create a problem after manufacturing, the microprocessor does not need to be thrown away. Rather, it can be reconfigured in the field, via software, to remove the particular defect.

BRIEF DESCRIPTION OF THE DRAWINGS

These and other objects, features, and advantages of the present invention will become better understood with regard to the following description, and accompanying drawings where.

DETAILED DESCRIPTION

Figure 1:
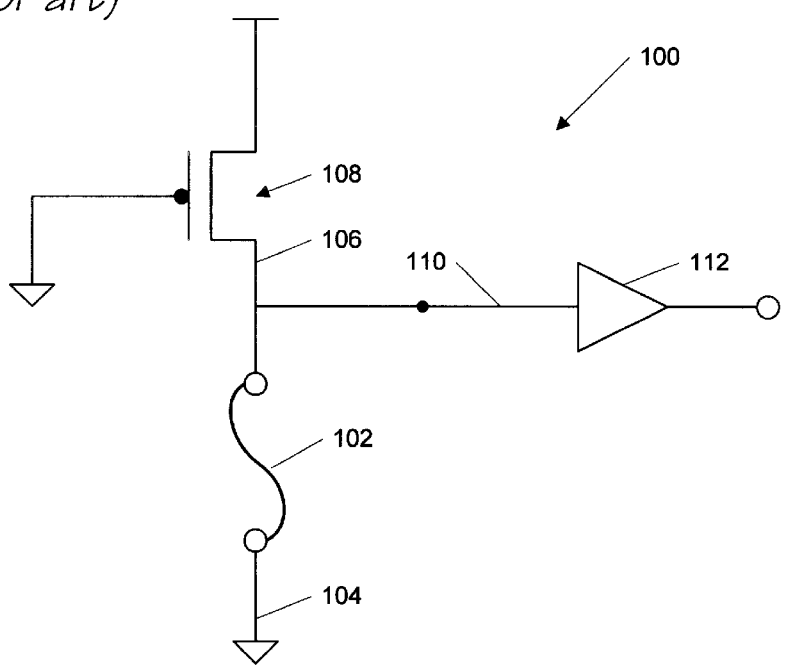
FIG. 1 is a schematic diagram of a prior art circuit that incorporates a fuse to modify an input signal to a control circuit.
Figure 2:
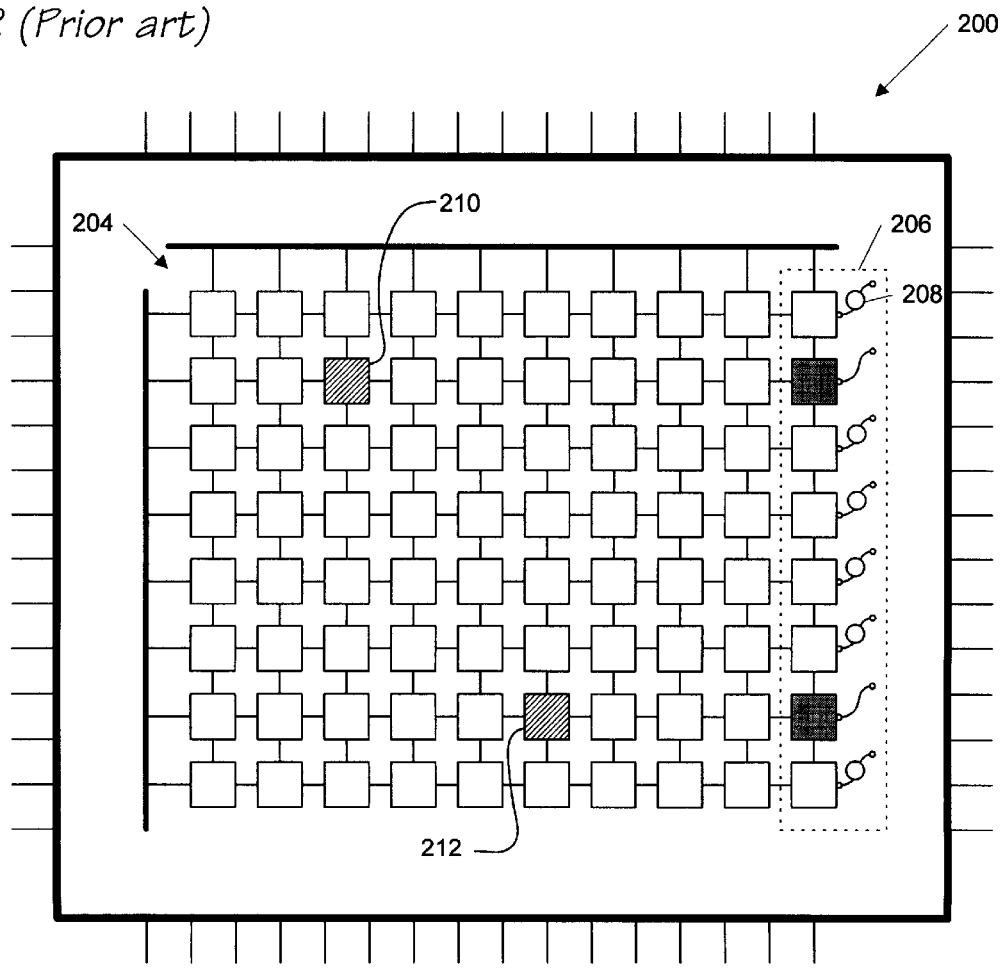
FIG. 2 is a block diagram of a prior art memory device that incorporates a plurality of spare memory cells that may be selectively enabled through a fuse connection.
Figure 3:
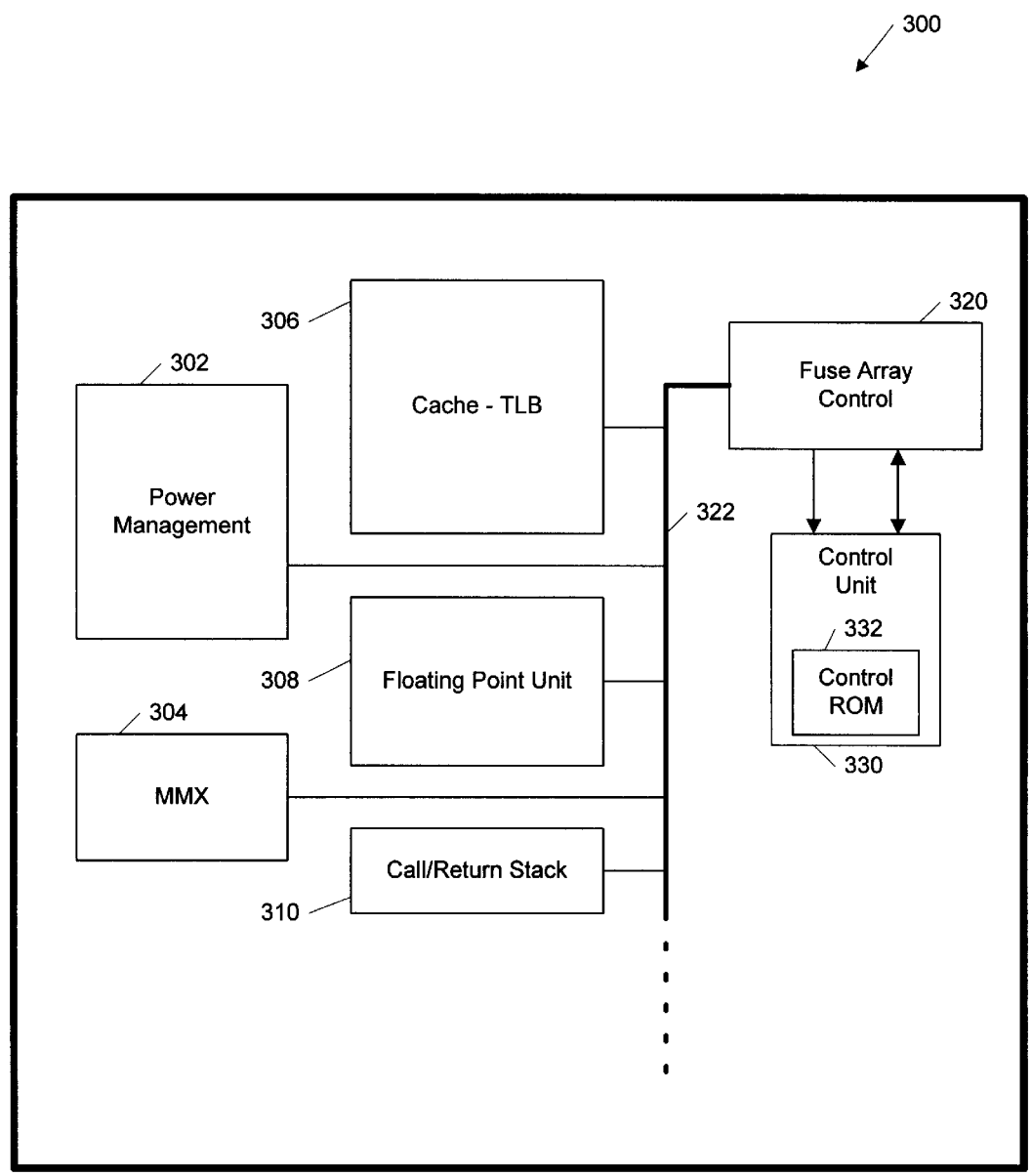
FIG. 3 is a block diagram of a microprocessor that incorporates a fuse array function enable control according to the present invention.

Referring to FIG. 3, a microprocessor 300 is shown that includes a number of functional blocks 302–310, each connected to a fuse array control 320 via enable/disable signal lines 322. The fuse array control 320 is also connected to a control unit 330 that contains a control ROM 332.

More specifically, the functional blocks include: power management logic 302, for managing power consumption of the microprocessor 300; multimedia extension (MMX) logic 304 for executing particular audio/video instructions applicable to multimedia applications; an on-chip L1 cache 306; a floating point unit 308, and Call/Return stack logic 310. Each of these functional blocks may be operationally enabled/disabled by the fuse array control 320, via an associated enable/disable signal line 322. Upon power up of the microprocessor 300, the control unit 330 reads the state of fuses within the fuse array 320, and stores a value in a feature control register (discussed below with reference to FIG. 4) that selectively enables/disables each of the function blocks 302–310.

Figure 4:
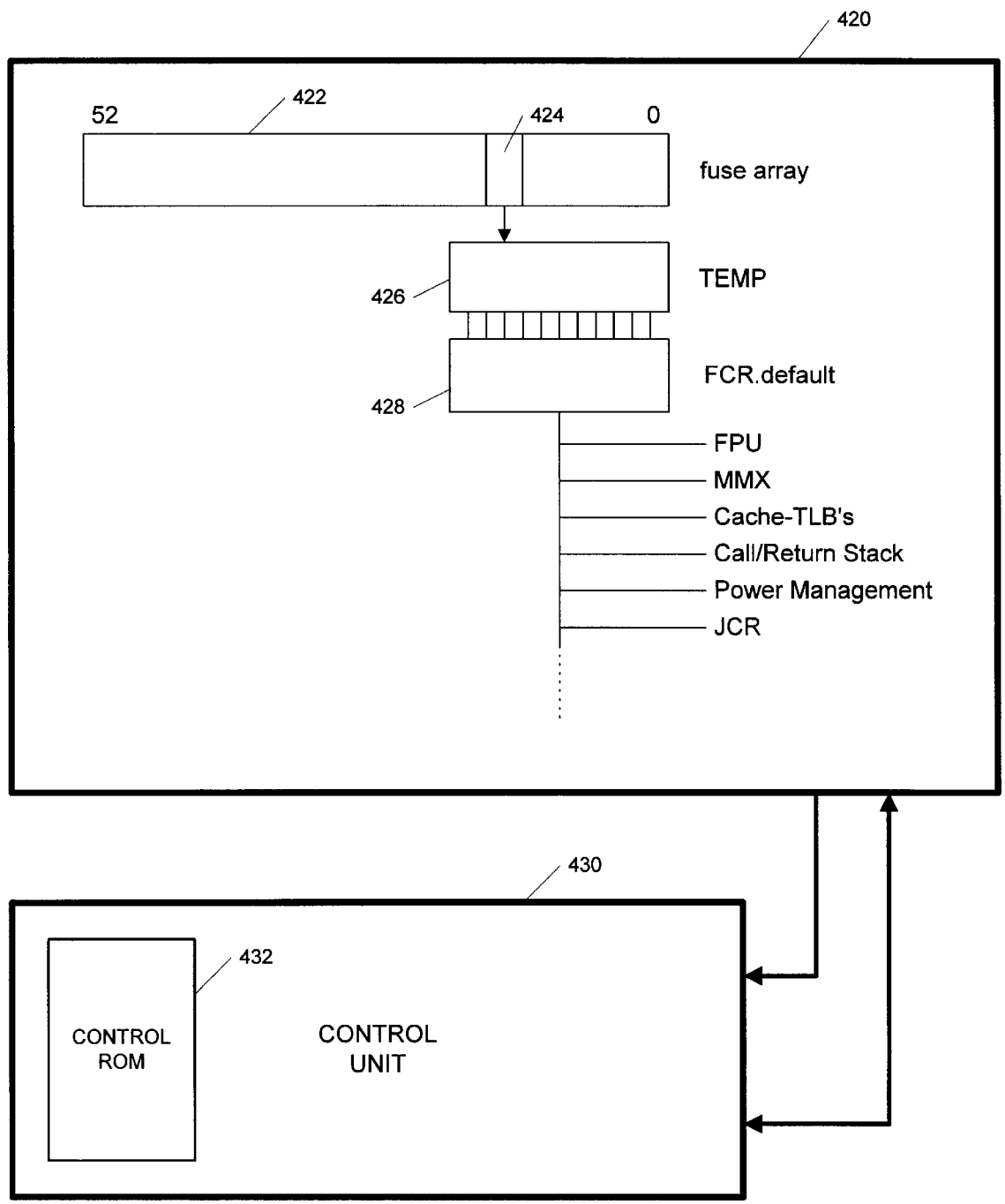
FIG. 4 is a block diagram of one embodiment of the fuse array control of FIG. 3.

Referring now to FIG. 4, a block diagram of a portion of a fuse array control 420 is shown, connected to a Control Unit 430. The fuse array control 420 contains a fuse array 422 that in one embodiment includes 52 individually accessible fuses 424. The fuses 424 may have a one to one correspondence with a particular functional block, such as those described in FIG. 3. Or, in the alternative, a plurality of fuses 424 may be configured such that their combined states indicates which of the functional blocks should be enabled/disabled. A lookup table could be used that maps the desired states of the functional blocks with the condition of the fuse array 422.

Connected to the fuse array 422 is a TEMP register 426. The TEMP register 426 provides a temporary storage space for storing the state of the fuses 424 in the fuse array 422. In one embodiment, at power up of the microprocessor, the control unit 430 reads the fuse array 422, and places stores the state of the fuses 424 into the TEMP register 426.

Connected to the TEMP register 426 is a feature control register (FCR) 428. The FCR register 428 is used to store a value that affects enablement of the functional blocks. More specifically, the FCR register 428 is connected to enable/disable signal lines 412, which in turn are connected to functional blocks. For example, bit 0 of the FCR register 428 might control enablement of power management on the microprocessor. If bit 0 is set to 0, power management would be disabled. If bit 0 is set to 1, power management would be enabled.

In one embodiment of the present invention, microcode within the control ROM 432 stores a default value for the FCR register 428 that configures the functional blocks according to a predetermined configuration. Upon power up, the default value is stored into the FCR register 428. Then, the fuse array 422 is read by the control unit 430, and if appropriate, the contents of the FCR register 428 are modified. A more specific explanation of how the FCR register 426 is set is provided, with reference to FIG. 5.

Figure 5:
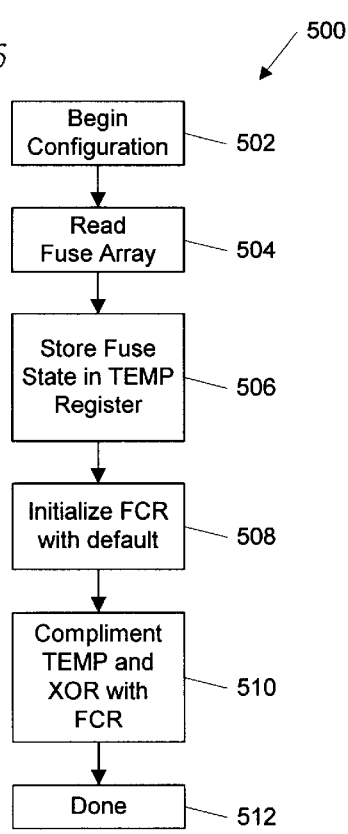
FIG. 5 is a flow chart illustrating how the feature control register of the present invention is set, during power up of the microprocessor of FIG. 3.

In FIG. 5, a flow chart 500 is provided that details the steps taken by the Control Unit 432, in one embodiment of the invention, to set the FCR register 428. Configuration begins at step 502 upon power up of the microprocessor. After a few cycles of power up reset, microcode gets control and proceeds to step 504.

At step 504, the state of the fuse array 422 (as set by blowing fuses at the time of manufacture) is read by the Control Unit 430. Instruction flow then proceeds to step 506.

At step 506, the state of the fuse array 422 is stored into the TEMP register 426. Instruction flow then proceeds to step 508.

At step 508, the Control Unit 430 stores a default value, obtained from microcode in the Control ROM 432, into the FCR register 428. Instruction flow then proceeds to step 510.

At step 510, a logical operation is performed between the contents of the TEMP register 426, and the FCR register 428, with the result of the operation being stored into the FCR register 428. The purpose of the logical operation is to allow the state of the fuse array 422 to effect the value stored into the FCR register 428, but not make the state of the fuse array 422 absolutely determinative. In one embodiment, the state of the fuse array 422 that was read into the TEMP register 426 is complemented, and then XOR'ed with the default value stored in the FCR register 428. This logical operation inverts the default for bits for which the fuse has been blown. Instruction flow then proceeds to step 512, completing the configuration of the FCR register 428.

One benefit of the logical operation is that it allows the state of the fuse array 422 to be converted into a value that has a one to one correspondence to the functional blocks, prior to it being merged with the default configuration.

Another benefit of the logical operation is that it allows the control unit 430 to selectively ignore the configuration information set by the fuse array 422. For example, it may be desired to fabricate a line of microprocessors that do not have MMX functionality. A default value for the FCR register 428 could indicate that this functional block is to be disabled. In addition, the microcode may also identify the bit associated with MMX as "sticky", indicating that the default configuration should not be changed by a write to the FCR (discussed below with reference to FIG. 7). Microcode therefore prevents the default bit associated with MMX from being changed after manufacturing. By providing this default configuration in microcode, manufacturing is not required to blow the fuse in the fuse array that indicates that MMX is to be disabled.

In some instances, it is desired to control enablement/disablement of particular functional blocks after the microprocessor has been manufactured and shipped to customers. For example, at the time of manufacture, a call/return stack may be enabled, either by the fuse array, or by the default configuration in microcode. However, after the product ships, it might be discovered that a problem exists with this functional block, in certain environments. When this problem is discovered, OEM's could be given directions to perform a write to the FCR (a machine specific register), with an appropriate data pattern that disables the call/return stack.

Figure 6:
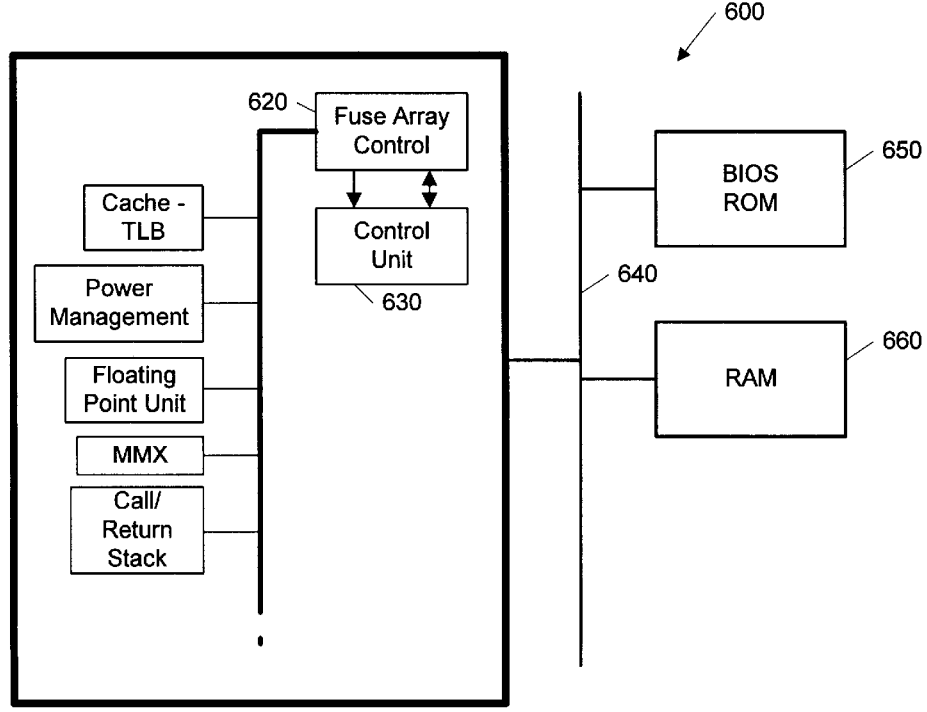
FIG. 6 is a block diagram of the microprocessor of FIG. 3, attached to two different memory devices.

Referring to FIG. 6, a block diagram 600 is shown that includes a microprocessor 602 connected to a BIOS ROM 650 and a RAM 660 via a system bus 640. In one embodiment, the BIOS ROM 650 contains a processor instruction that is executed after reset, that performs a write to the FCR register within a fuse array control 620 that enables/disables a particular functional block. Operation of how the write instruction modifies the FCR register is illustrated by a flow chart 700 in FIG. 7.

Figure 7:
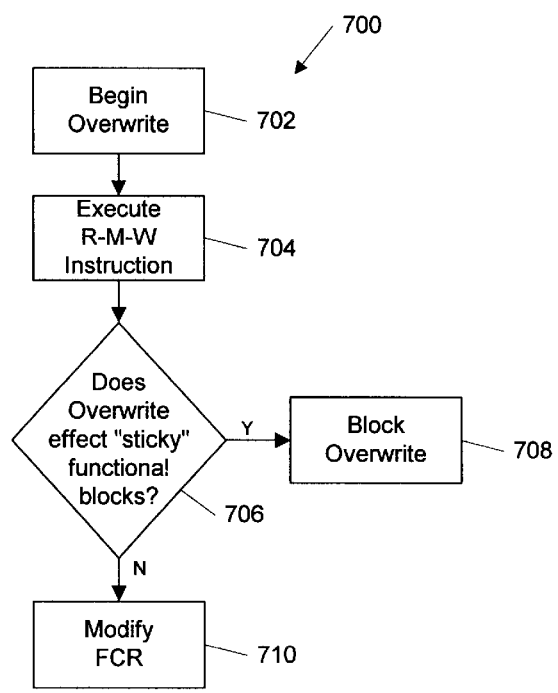
FIG. 7 is a flow chart illustrating how the feature control register of the present invention may be set via a software instruction that performs a write to the feature control register.

In FIG. 7, the operation for overwriting the FCR register begins at step 702 when a read-modify-write instruction is fetched from the BIOS ROM 650 and provided to the microprocessor 602 for execution. Instruction flow then proceeds to step 704.

At step 704, the R-M-W instruction is executed by the microprocessor 602. The R-M-W instruction provides an operand reflecting the new state of the FCR register, or merely indicating the bit that must be changed in the FCR. For example, the R-M-W instruction might include an operand of the form 00000100B, indicating that bit 3 of the FCR is to be changed. Instruction flow then proceeds to decision block 706.

At decision block 706, microcode in the control unit determines whether the bit change requested by the R-M-W instruction corresponds to a sticky bit, i.e., relates to a functional block that should not be changed. If the R-M-W is to a sticky function block, instruction flow proceeds to step 708 where the write is blocked. Otherwise, the FCR is modified and written to, at step 710.

To understand why a write to the FCR should be blocked, an example is provided. Suppose an attempt is made to write to the FCR to enable the MMX functional block. However, the customer performing the write instruction did not pay for processors with MMX technology. The customer is attempting to enable a functional block on processors, when the functional block has not been paid for. When the write attempt is made, microcode within the control unit blocks the change, at least to those functional blocks considered sticky.

The invention described above illustrates a method and apparatus that allows a plurality of functional blocks to be selectively enabled/disabled, via a hardware fuse array, and via software control, both at time of manufacture, and later, after the semiconductor devices have been shipped.

Although the present invention and its advantages have been described in considerable detail, those skilled in the art should appreciate that they can readily use the disclosed conception and specific embodiments as a basis for designing or modifying other structures for carrying out the same purposes of the present invention. For example, a TEMP register was shown between the fuse array and the FCR register, to temporarily store the state of the fuse array. In some embodiments, this register may not be necessary. Rather, hardware logic may be placed between the fuse array and the FCR that implements the logical operation performed above in software. Moreover, while it is believed that utilization of the control unit to modify the FCR register provides the most flexibility and control over the functional blocks, it may be desired to implement the functions described above in hardware. Also, the embodiment described shows the FCR register connected directly to the functional blocks via enable/disable signal lines. It is possible that intermediate logic may be desired between the functional blocks and the FCR register. Furthermore, only a few functional blocks have been described. It is within the minds of the inventors that the features of the present invention be extended to any circuitry within a semiconductor device that requires a static signal to be provided for proper configuration and operation.

In addition, it should be understood that various changes, substitutions and alterations can be made herein without departing from the spirit and scope of the invention as defined by the appended claims.

We claim:

1. A microprocessor, having a plurality of functional blocks, the plurality of functional blocks being individually enabled/disabled, the microprocessor comprising:

a fuse array control, coupled to the plurality of functional blocks, said fuse array control selectively signaling the plurality of functional blocks to be enabled/disabled, said fuse array control having a fuse array; and a control unit, coupled to said fuse array control, for reading said fuse array, and indicating to said fuse array control which of the plurality of functional blocks should be enabled/disabled.

2. The microprocessor, as recited in claim 1, wherein the functional blocks comprise:

power management;

floating point unit; and multimedia extensions (MMX).

3. The microprocessor, as recited in claim 1, wherein functional block that is disabled does not perform its intended function on the microprocessor.

4. The microprocessor, as recited in claim 1, wherein said fuse array control further comprises a plurality of enable/disable signals.

5. The microprocessor, as recited in claim 4, wherein each of said plurality of enable/disable signals are connected to a corresponding one of the plurality of functional blocks.

6. The microprocessor, as recited in claim 4, wherein said fuse array control selectively signals the plurality of functional blocks to be enabled/disabled via said plurality of enable/disable signals.

7. The microprocessor, as recited in claim 1, wherein said fuse array comprises a plurality of fuses, fabricated on the microprocessor.

8. The microprocessor, as recited in claim 7, wherein said plurality of fuses are fabricated in a closed state.

9. The microprocessor, as recited in claim 8, wherein ones of said plurality of fuses may be selectively blown during manufacturing.

10. The microprocessor, as recited in claim 9, wherein said ones of said plurality of fuses that are blown are in an open state.

11. The microprocessor, as recited in claim 10, wherein said open/closed states of said ones of said plurality of fuses is partly determinative of which of the functional blocks should be enabled/disabled.

12. The microprocessor, as recited in claim 1, wherein said fuse array control further comprises a feature control register, coupled to said fuse array, into which at least a portion of the state of said fuse array is stored.

13. The microprocessor, as recited in claim 12, wherein the state of said fuse array is stored into said feature control register upon power up of the microprocessor.

14. The microprocessor, as recited in claim 13, wherein contents of said feature control register are indicative of which of the functional blocks should be enabled/disabled.

15. The microprocessor, as recited in claim 12, wherein a manufacturer selectively blows fuses within said fuse array to determinatively enable/disable ones of the plurality of functional blocks on the microprocessor.

16. The microprocessor as recited in claim 12, wherein contents of said feature control register are read by said control unit.

17. The microprocessor, as recited in claim 16, wherein said control unit overwrites said contents of said feature control register.

18. The microprocessor, as recited in claim 17, wherein said control unit overwrites said contents of said feature control register to override enabling/disabling of ones of the functional blocks specified by the state of said fuse array.

19. The microprocessor, as recited in claim 18, wherein if said control unit does not overwrite said contents of said feature control register, the plurality of functional blocks are enabled/disabled based on the state of said fuse array.

20. The microprocessor, as recited in claim 19, wherein if said control unit does overwrite said contents of said feature control register, the plurality of functional blocks are enabled/disabled based on program instructions executed by the microprocessor.

21. The microprocessor, as recited in claim 20, wherein said program instructions comprise microcode stored within said control unit.

22. The microprocessor, as recited in claim 20, wherein said program instructions comprise BIOS instructions stored outside of the microprocessor.

23. The microprocessor, as recited in claim 22, wherein said BIOS instructions perform a write to a machine specific register (MSR), which is said feature control register.

24. The microprocessor, as recited in claim 23, wherein said write to said MSR may be partially or wholly blocked by said control unit.

25. The microprocessor, as recited in claim 1, wherein said control unit further comprises a control ROM.

26. The microprocessor, as recited in claim 25, wherein said control ROM contains microcode for selectively enabling/disabling ones of the plurality of functional blocks on the microprocessor.

27. A microprocessor, having a plurality of functional blocks that are individually enabled/disabled, the microprocessor comprising:

a fuse array, fabricated on the die of the microprocessor, the fuse array comprising a plurality of fuses that may be individually blown during manufacturing;

a feature control register, coupled to said fuse array, said feature control register for selectively enabling/disabling ones of said plurality of functional blocks; and a control unit, coupled to said feature control register, for reading the state (closed or open) of said plurality of fuses, and for storing into said feature control register a value indicative of which of said plurality of functional blocks are to be enabled/disabled.

28. The microprocessor, as recited in claim 27, wherein the plurality of functional blocks comprises:

power management;

multimedia extensions (MMX); and a floating point unit.

29. The microprocessor, as recited in claim 27, wherein the plurality of functional blocks are individually enabled/disabled via signal lines that couple the plurality of functional blocks to said feature control register.

30. The microprocessor, as recited in claim 27, wherein said fuse array is coupled to said control unit to allow said control unit to read the state (closed or open) of each of said plurality of fuses.

31. The microprocessor, as recited in claim 27, wherein ones of said plurality of fuses are selectively blown during manufacturing to configure the microprocessor to include or exclude particular ones of the plurality of functional blocks.

32. The microprocessor, as recited in claim 31, wherein the state of said plurality of fuses are logically merged with a default configuration for the microprocessor to modify said default configuration for those of said plurality of fuses that are blown.

33. The microprocessor, as recited in claim 32, wherein said default configuration is XOR'ed with the compliment of said plurality of fuses.

34. The microprocessor, as recited in claim 32, wherein said merged default configuration is stored in said feature control register.

35. The microprocessor, as recited in claim 27, wherein said feature control register comprises enable/disable signal lines, coupled to each of the plurality of functional blocks, to selectively enable/disable ones of said plurality of functional blocks.

36. The microprocessor, as recited in claim 35, wherein said feature control register further comprises a plurality of control bits, coupled to said enable/disable signal lines, to selectively enable/disable ones of said plurality of functional blocks.

37. The microprocessor, as recited in claim 27, wherein said feature control register further comprises a temporary register, coupled to said fuse array, for temporarily storing said state of said plurality of fuses to allow said state to be logically merged with a default configuration for said feature control register.

38. The microprocessor, as recited in claim 27, wherein said control unit further comprises a control ROM that stores a default configuration for the plurality of functional blocks on the microprocessor.

39. The microprocessor, as recited in claim 37, wherein said control unit reads said state of said plurality of fuses from said fuse array, and temporarily stores said state into said temporary register.

40. The microprocessor, as recited in claim 27, wherein the microprocessor further comprises a processor instruction for writing a configuration command to said feature control register.

41. The microprocessor, as recited in claim 40, wherein said processor instruction overwrites said feature control register to selectively enable/disable particular ones of said plurality of functional blocks.

42. The microprocessor, as recited in claim 41, wherein said plurality of functional blocks are selectively enabled/disabled by either a default configuration, said state of said fuse array, or execution of said processor instruction.

43. The microprocessor, as recited in claim 40, wherein said control unit selectively blocks portions of said overwrites by said processor instruction to prevent certain ones of said plurality of functional blocks from being enabled/disabled by said processor instruction.

44. The microprocessor, as recited in claim 43, wherein said certain ones of said plurality of functional blocks that are prevented from being enabled/disabled by said processor instruction comprise multimedia extensions (MMX).

45. A method for selectively enabling/disabling functional blocks on a microprocessor, the microprocessor having a plurality of fuses, ones of which are blown during manufacturing, the method comprising the steps of:
   reading the state of the plurality of fuses;
   determining from said step of reading which of the functional blocks are to be enabled/disabled;
   logically merging results from said step of determining with a predetermined configuration for the functional blocks; and
   enabling/disabling the functional blocks according to the result from said step of logically merging.

46. The method for selectively enabling/disabling functional blocks on a microprocessor, as recited in claim 45, wherein the method further comprises the step of:
   executing an instruction to overwrite a portion of the results from said step of logically merging to selectively enable/disable the functional blocks after the ones of the plurality of fuses are blown.

47. The method for selectively enabling/disabling functional blocks on a microprocessor, as recited in claim 46, wherein the method further comprises the step of:
   blocking a portion of the overwrite of said step of executing to prevent certain ones of the functional blocks from being enabled/disabled by said step of executing.

* * * * *